April 6, 1965    E. NYBORG    3,176,745
LOCKING DEVICE FOR THREADED FASTENERS
Filed March 21, 1962
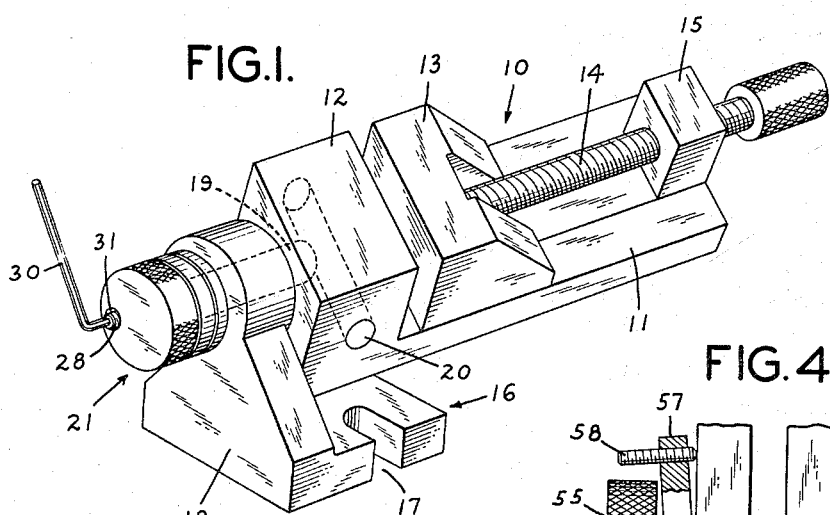
FIG.1.
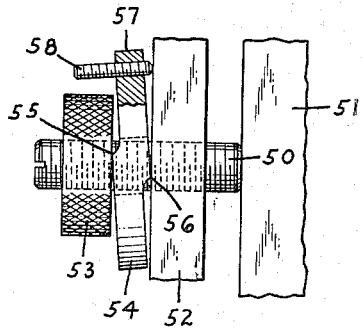
FIG.4.
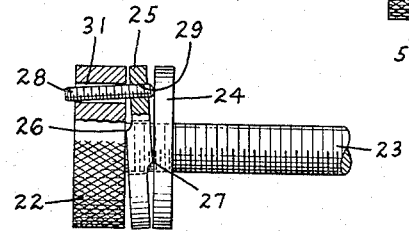
FIG.2.
FIG.3.
INVENTOR
EDWARD NYBORG
BY
HIS ATTORNEYS

3,176,745
LOCKING DEVICE FOR THREADED FASTENERS
Edward Nyborg, Union, N.J., assignor of one-fourth to Wadsworth W. Mount, Warren Township, N.J., and one-fourth to The Nylok Corporation, Paramus, N.J., a corporation of Delaware
Filed Mar. 21, 1962, Ser. No. 181,314
4 Claims. (Cl. 151—20)

This invention relates to locking devices for threaded fasteners and particularly to devices for locking a threaded fastening element for securing elements in a precise predetermined relation or with a predetermined pressure applied thereto.

Many different kinds of devices must be accurately positioned and secured in the desired position by means of screws, bolts or the like. Ordinarily, no difficulty is encountered in securing such devices in position with the screw, bolt or nut in hand-tight relation. However, when high torque is applied by means of a wrench or the like, in order to firmly seat and secure the elements, the position of the parts is changed almost unavoidably and the accurate relation of the devices is lost, thereby requiring further and difficult adjustment. By way of example, in a clamp or vise which is used on a drill press for holding workpieces to be drilled, the vise is usually secured to a fixture by means of screws or bolts. In order to avoid movement of the vise during drilling, the bolts must be tightened to a high torque valve. During such tightening, the bolts have a tendency to slide or to turn and cause the vise to shift or turn, thereby causing misalignment of the vise and creating a difficult situation when workpieces are to be drilled with tolerances within a few thousandths of an inch.

In like fashion, frequently it is desired to hold relatively movable elements with a predetermined pressure or contact therebetween. For example, in shears or scissors, the blades must be held in close relation to assure proper contact of their cutting edges. The mechanisms for obtaining such adjustment are at best rather crude and frequently the adjusting screw is turned in one direction or another with the result that the desired shearing relation between the blades is not obtained.

In accordance with the present invention, a device is provided which enables a screw, nut, bolt or the like to be turned up to assure the accurate positioning or relation of elements and thereafter may be locked without further rotation or shifting to thereby maintain a precisely adjusted relation of the parts.

More particularly, in accordance with the invention, the locking device includes a fulcrum member which may be rocked by means of a suitable adjusting member to apply an additional tension stress to the nut, bolt, screw, or the like, without rotation or other movement causing misalignment or misadjustment of the parts or other change of the relation of the parts. In a typical device, the fulcrum member may be a washer-like element having fulcra thereon which is received loosely on the shank of a bolt or the like between the head thereof or a nut thereon and the element which is being secured. By rocking the washer-like fulcrum member around the fulcrum edges thereon, it is brought into engagement with the member and the head of the screw, bolt or nut and exerts pressure thereon which wedges and secures the elements and prevents their rotation.

For a better understanding of the present invention, reference may be had to the accompanying drawings, in which:

FIGURE 1 is a perspective view of a vise secured by means of a bolt and a locking device of the type embodying the present invention;

FIGURE 2 is a side elevational view of a bolt and locking element embodying the present invention;

FIGURE 3 is an elevational view, partially broken away, illustrating a modified form of a locking device; and FIGURE 4 is an elevational view of another form of locking device embodying the invention.

Referring to FIGURE 1, there is disclosed a vise 10 such as that used on a drill press, a milling machine or the like for clamping a workpiece to be machined. The vise 10 disclosed includes a base member 11 having a clamping jaw 12 thereon and carrying a slidable jaw 13 which may be advanced by means of a screw 14 threaded in a block 15 fixed to the base member 11 to clamp the workpiece. In order to hold the workpiece clamped between the jaws 12 and 13 precisely in a drill press, milling machine or the like, the vise 10 is adjustable into various angular positions and, as shown in FIGURE 1, is slightly tilted with respect to a horizontal plane. The vise 10 is mounted on a base 16 which is provided with slots 17 on opposite sides for receiving bolts or screws to attach it to the table of the drill press or the like. An upright support 18 is secured to the base and serves to support the vise 10. A screw 21 or the like extends through an unthreaded hole in the upright 18 which supports the vise by engagement in a threaded hole 19 in the end of the jaw 12. The vise also can receive the screw in either end of the threaded hole 20 which extends transversely through the jaw 12 to enable universal positioning of the clamp relative to the base 16.

In accordance with the present invention, a novel locking device is used to secure the vise 10 to the support 16. As shown in FIGURE 2, the screw 21 includes a knurled head 22 and a threaded shank 23 which are screwed into one of the holes 19 or 20. Loosely received on the shank 23 is a washer 24 which serves as a wear member but is not essential to the locking device. Interposed between the head 22 on the screw and the washer 24 is a rigid, hardened locking member 25 which is loosely and rockably received on the shank 23. Portions of opposite sides of the washer 25 are cut away or relieved in order to form a pair of parallel fulcrum portions or edges 26 and 27 extending transversely of the washer on opposite sides of and equidistant from its center. These edges, as shown in FIGURE 2, are spaced apart somewhat less than the diameter of the shank 23 of the screw so that when the locking member is tilted, the shoulders bear against the head 22 and the washer 24 and force them apart to jam and lock the screw against rotation. Means is provided for rocking the locking member, such as, for example, a socket head screw 28 which is threaded through a hole 29 in the washer between the edge of the locking member 25 and the fulcrum edge 26. The screw 28 is located on a diameter or radius of the locking member 25 substantially perpendicular to the fulcrum edges 26 and 27.

In adjusting the vise 10 with respect to the base member 16, the screw 28 is backed out until its right-hand end, as viewed in FIGURE 2, is about flush with the right-hand face of the locking member 25. The bolt 22 is then turned up until it is about hand-tight and with the bolt in this position, the vise 10 is adjusted accurately with a gauge or the like to the desired angle. Thereafter, an Allen wrench 30 is inserted in the end of the screw 28 and the screw is rotated to engage the washer 24 and cause the locking member 25 to tilt, thereby exerting a tensioning stress on the screw 21, and pulling the jaw 12 tightly against the upright 18 without in any way changing the angular or adjusted position of the vise 10 and preventing it from being twisted or dislodged by the forces exerted on the workpiece clamped therein.

It will be understood, of course, that the screw 28 must be accessible and to that end, the head of the screw is provided with a hole 31 therethrough which receives the screw 28 loosely and accommodates its tilting movement with the locking member 25 as the latter is tilted.

Similar locking devices 21 can be used for clamping many other articles or for drawing elements together with sufficient force to prevent their movement or slippage. It is also useful for locking an element in a desired position along a slot.

Similar types of devices embodying a modification of the invention may be used for adjusting the pressure or relation of movable elements such as sliding or pivoting knives and other devices where an intimate surface contact is required. Thus, as shown in FIGURE 3, a locking device of the type embodying the invention may be used for locking an adjusting screw for applying a predetermined pressure to the blades 35 and 36 of a pair of scissors or shears. One blade 36 is provided with a center hole 37 through which a threaded shank 38 of a bolt 39 passes freely. The other blade 35 is provided with a threaded hole 40 therethrough into which the bolt is threaded and adjusted until the head 41 of the bolt retains the blades 35 and 36 in proper cutting cooperation. The locking device utilized with scissors of the type shown in FIGURE 3 includes a knurled nut 42 which is threaded onto the left-hand end of the threaded shank 38 of the bolt. A locking member 43 is interposed between the nut 42 and the blade 36 and has fulcrum edges 44 and 45 as described above and a screw 46 for rocking or tilting the locking member 43 to jam it against the blade 35 and the nut 42 and thereby prevent the bolt 39 from rotating relative to the blade 35. In this way, when the bolt 39 is properly adjusted to bring the blades 35 and 36 into cutting relation, the bolt can neither be tightened nor loosened with respect to the blade 36. Nevertheless, after the blades are worn somewhat, the bolt 39 can be tightened to restore proper cutting relation and the screw 46 is again tightened to lock the bolt and nut in their readjusted position. While the nut 42 is illustrated as having a hole 48 therethrough for receiving the adjusting screw 46, it is not necessary. A smaller nut 42 and a more extended locking member 43 of lever-like form may be used to dispose the adjusting screw 46 outside the periphery of the nut.

FIGURE 4 illustrates a lever-like locking member applied to a threaded stud 50 which is used as a stop or positioning member for an element 51. A threaded bore in a fixed support 52 receives the stud 50 for lengthwise adjustment. A nut 53 is threaded on the stud and retains the locking member 54 adjacent to the support 52. As described above, a pair of fulcrum edges 55 and 56 are formed on the locking member on opposite sides of and equidistant from its center, the locking edges being spaced apart a lesser distance than the diameter of the stud. An arm 57 extends from the locking member approximately perpendicular to the edges 55 and 56 and receives an adjusting screw 58 which may be advanced to engage the support 52 and rock the locking member 54.

In use, the stud is adjusted in the support to the desired axial position and the nut 53 is turned up against the locking member 54, with the adjusting screw backed off so that the locking member lies substantially in face-to-face engagement with the nut 53 and support 52. The screw 58 is then turned to rock the locking member in a direction to force the nut 53 away from the support 52, thereby applying tension to the stud 50 and securing it against rotation. Little, if any, torque is applied to the stud for the reason that the relatively close spacing of fulcrum edges 55 and 56 and their parallelism prevents a rotational or bending force from being developed.

Many other variations of the structure and relations of the locking device and many other uses for it will be apparent. Accordingly, the forms of the invention disclosed herein should be considered as illustrative and not as limiting the scope of the following claims.

I claim:

1. A device for locking an internally threaded member against rotation relative to a bolt having a head and a shank threaded into said member, comprising a generally flat sided locking element having a hole therein larger than and loosely receiving said shank between said head and said member, each side of said locking element having a relieved portion to form parallel fulcrum edges on opposite sides thereof, said edges being spaced in opposite directions from the center of said hole to permit rocking movement relative to said shank, and a screw member threaded in said locking element radially spaced from said hole for rocking said locking member around said fulcrum edges to wedge said head and said member apart and retain them against relative rotation.

2. The device set forth in claim 1 in which said head has a hole therethrough larger in diameter than and receiving said screw member loosely for rocking and endwise movement relative thereto.

3. A pivot mechanism comprising a first member having a hole therein, a second member having a threaded hole therein, a pivot member having a threaded shank extending through the hole in said first member and threaded into the hole in said second member, means on one end of said pivot member engaging said first member to connect it to said second member for relative movement, a nut threaded on said threaded shank adjacent to said second member, a generally flat sided locking element having a hole therein larger than and loosely receiving said shank between said nut and said second member, each side of said locking element having a relieved portion to form parallel fulcrum edges on opposite sides thereof, said edges being spaced in opposite directions from the center of said hole to permit rocking movement relative to said shank and a screw member threaded in said locking element radially spaced from said hole for rocking said locking element around said fulcrum edges to wedge said nut and said second member apart and retain them against relative rotary movement.

4. The pivot mechanism set forth in claim 3 in which said nut has a hole therethrough larger in diameter than and loosely receiving said adjusting screw for rocking and endwise movement.

References Cited by the Examiner

UNITED STATES PATENTS

| | | | |
|---|---|---|---|
| 171,898 | 1/76 | Wiles. | |
| 1,231,840 | 7/17 | Bolt | 151—20 |
| 1,552,546 | 9/25 | DeSmith | 151—14 |
| 1,890,105 | 12/32 | Yanchenko | 151—20 |

FOREIGN PATENTS 20,096   9/06   Great Britain.

EDWARD C. ALLEN, *Primary Examiner.*

CARL W. TOMLIN, *Examiner.*